United States Patent [19]

Kanazawa

[11] Patent Number: 4,789,204

[45] Date of Patent: Dec. 6, 1988

[54] RECLINING DEVICE FOR AUTOMOTIVE SEAT

[75] Inventor: Yuzo Kanazawa, Gifu Prefecture, Japan

[73] Assignee: Ikeda Bussan Co., Ltd., Ayase, Japan

[21] Appl. No.: 123,320

[22] Filed: Nov. 20, 1987

[30] Foreign Application Priority Data

Dec. 29, 1986 [JP] Japan .............. 61-199243[U]

[51] Int. Cl.⁴ .............................................. B60N 1/02
[52] U.S. Cl. .................................... 297/355; 248/634
[58] Field of Search ............... 248/568, 580, 593, 632, 248/634, 633; 297/355, 362

[56] References Cited

U.S. PATENT DOCUMENTS 3,380,314 4/1968 Halsted ..................... 248/632 X
3,432,127 3/1969 Philipp ......................... 248/634
4,505,515 3/1985 Wilking et al. ................ 297/362
4,634,181 1/1987 Pipon .......................... 297/362

Primary Examiner—James T. McCall
Attorney, Agent, or Firm—Foley & Lardner, Schwartz, Jeffery, Schwaab, Mack, Blumenthal & Evans

[57] ABSTRACT

Herein disclosed is a reclining device of an automotive seat. The device comprises substantially identical two units which are spaced from each other, each unit having an operation handle for achieving an angular position adjustment of a seatback relative to a seat cushion. An elongate rod extends between the operation handles to effect synchronous pivotal movements of the same. A resilient block constructed of polyurethane foam, sponge rubber or the like is disposed between the rod and a part of the seat cushion to suppress vibration of the rod.

5 Claims, 2 Drawing Sheets

RECLINING DEVICE FOR AUTOMOTIVE SEAT

BACKGROUND OF THE INVENTION

1. Field of the Invention

The present invention relates in general to automotive seats, and more particularly to reclining devices for automotive seats of a bench type.

2. Description of the Prior Art

In order to clarify the present invention, a prior art reclining device for a bench seat will be described with reference to FIGS. 4 and 5.

Referring to FIG. 4, there is shown a bench type seat 1 used particularly as a rear seat of a passenger motor vehicle. The seat 1 is of a reclining type wherein a seatback 3 is stepwisely inclinable relative to a seat cushion 2. Designated by numerals 4 and 4 are right and left units of the seat reclining device, which are arranged at respective sides of the seat 1 to achieve the stepwise inclination of the seatback 3. As is seen from Fig. 5, each unit 4 comprises a base portion 4A to which essential parts of a known reclining mechanism are mounted, a handle 4C extending forward from the reclining mechanism and an arm 4B extending upward from the same. The base portion 4A is secured to the seat cushion 2, while the arm 4B is secured to the seatback 3, so that upon manipulation of the handle 4C, the arm 4B and thus the seatback 3 can be inclined to a desired angular position relative to the seat cushion 2. For achieving synchronous pivotal movements of the two handles 4C and 4C, an elongate rod 5 is arranged to extend between the handles in a manner to serve as a common pivot shaft for them. That is, the adjustment of angular position of the seatback 3 can be carried out by manipulating either one of the handles 4C and 4C.

However, due to its inherent construction, the reclining device of the above-mentioned type tends to produce uncomfortable noise particularly at the connecting rod 5 during operation of the associated motor vehicle. That is, due to vibration of the associated motor vehicle during engine idling and/or vehicle running, the elongate rod 5 is forced to vibrate or resonate to produce the undesirable noise.

SUMMARY OF THE INVENTION

It is therefore an object of the present invention to provide a reclining device for a seat, which is free of the above-mentioned drawback.

According to the present invention, there is provided a reclining device for the above-mentioned bench type seat, which has a vibration insulating block installed therein.

According to the present invention, there is provided, in an automotive seat having a seat cushion and a seatback, a reclining device which comprises first and second substantially identical units which are respectively arranged at lateral sides of the seat, each unit including a base portion secured to the seat cushion, essential parts of a reclining mechanism mounted to the base portion, an operation handle extending from the essential parts, and an arm extending from the essential parts and secured to the seat back, so that upon manipulation of the operation handle, the angular position of the seatback relative to the seat cushion can be adjusted; an elongate rod having longitudinal both ends respectively connected to the operation handles thereby to achieve a synchronous pivotal movement of the operation levers about the axis of the rod; and a resilient block interposed between the elongate rod and a part of the seat cushion.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
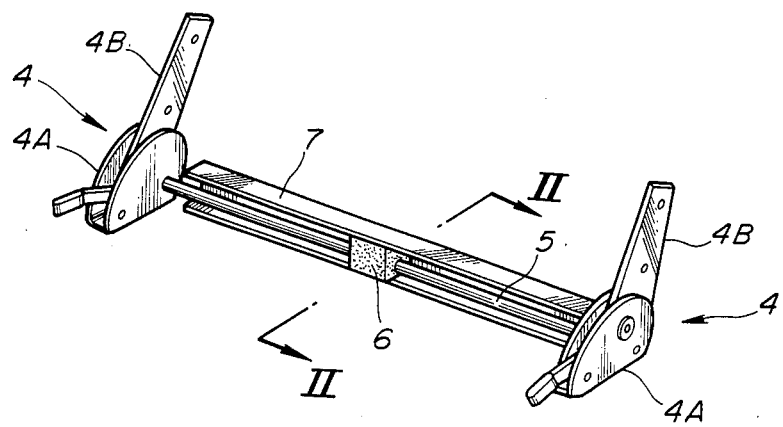
FIG. 1 is a perspective view of a reclining device according to the present invention.
Figure 2:
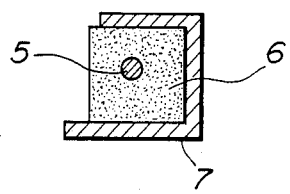
FIG. 2 is a sectional view taken along the line II—II of FIG. 1.
Figure 5:
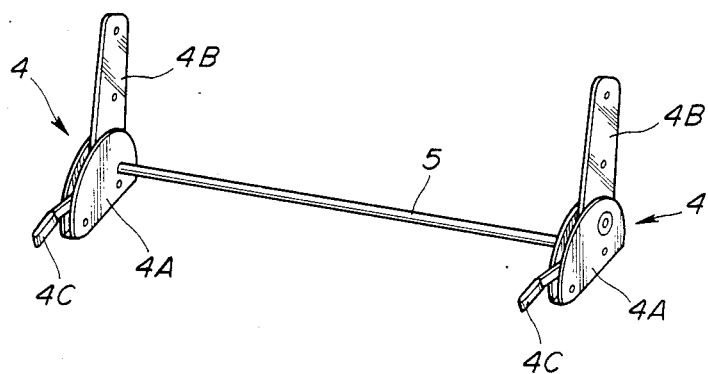
FIG. 5 is a perspective view of the conventional reclining device used in the seat of FIG. 4.

Referring to FIGS. 1 and 2, there is shown a reclining device according to the present invention. For ease of understanding, substantially the same parts as those in the afore-mentioned conventional device of FIG. 5 are designated by the same numerals.

Figure 4:
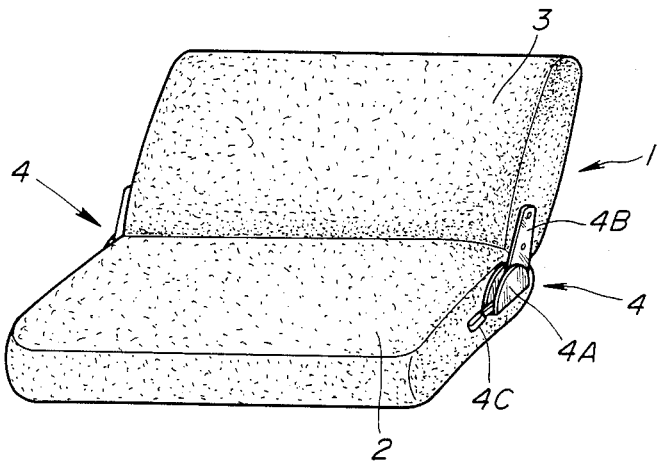
FIG. 4 is a perspective view of an automotive rear seat which is equipped with a conventional reclining device.

The reclining device comprises a pair of substantially identical units 4 and 4 which are respectively mounted to rear sides of a seat cushion (not shown) in a manner as is understood from FIG. 4. Similar to the above-mentioned conventional unit, each unit 4 comprises a base portion 4A to which essential parts of a known reclining mechanism are mounted, a handle 4C extending forward from the reclining mechanism and an arm 4B extending upward from the same. The base portion 4A is secured to the seat cushion, while the arm 4B is secured to the seatback (not shown), so that upon manipulation of the handle 4C, the seatback can be inclined to a desired angular position relative to the seat cushion. For achieving synchronous pivotal movements of the two handles 4C and 4C, an elongate rod 5 is arranged to extend between the handles while passing through openings (no numerals) formed in inboard plates of the base portions 4A and 4A, so that the rod 5 serves as a common pivot shaft of the handles 4C and 4C. Thus, the angular position adjustment of the seatback relative to the seat cushion is achieved by manipulating either one of the handles 4C and 4C.

Designated by numeral 7 is a channel-like rear frame of the seat cushion, which extends along the elongate rod 5 while covering the same. As is seen from FIG. 2, a resilient block 6 is plugged in a middle portion of the channel-like rear frame 7 having the rod 5 passed therethrough. Preferably, the resilient block 6 is bonded to the frame 7. The resilient block 6 is constructed of, for example, polyurethane foam, sponge rubber, elastic rubber, felt or the like.

With the provision of the resilient block 6 through which the elongate rod 5 is connected to the fixed rear frame 7 of the seat cushion, the rod is prevented from making vibration even when the associated vehicle body vibrates. Thus, the undesired noise is not produced from the rod 5.

Figure 3:
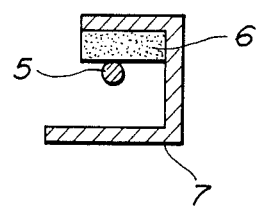
FIG. 3 is a view similar to FIG. 2, but showing a modification of the reclining device of the present invention.

If desired, the resilient block 6 may be compressed between the rod 5 and one wall of the channel-like rear frame 7, as is seen from FIG. 3.

What is claimed is:

1. In an automotive seat having a seat cushion and a seatback, a reclining device comprising:
    first and second substantially identical units which are respectively arranged at lateral sides of the seat, each unit including a base portion secured to said seat cushion, essential parts of a reclining mechanism mounted to said base portion, an operation handle extending from the essential parts, and an arm extending from the essential parts and secured to said seatback, so that upon manipulation of the operation handle, the angular position of the seatback relative to said seat cushion can be adjusted;
    an elongate rod having both ends respectively connected to the operation handles of the first and second units thereby to achieve a synchronous pivotal movement of the operation handles about the axis of the elongate rod;
    a channel-like frame provided in a rear part of said seat cushion, said channel-like frame extending along said elongate rod partially covering the same; and
    resilient means mounted to restrain vibration of a longitudinally middle portion of said elongate rod in such a manner that at least a part of the resilient block is compressed between said elongate rod and said channel-like frame.

2. A reclining device as claimed in claim 1, in which said resilient block has a bore through which said elongate rod passes.

3. A reclining device as claimed in claim 2, in which said resilient block is bonded to said frame or the seat cushion.

4. A reclining device as claimed in claim 1, in which said resilient block is plugged in a longitudinally middle portion of the channel-like frame.

5. A reclining device as claimed in claim 4, in which said resilient block is constructed of polyurethane foam, sponge rubber, elastic rubber or felt.

* * * * *